(No Model.)
E. J. SMITH.
WHIFFLETREE.
No. 508,444. Patented Nov. 14, 1893.
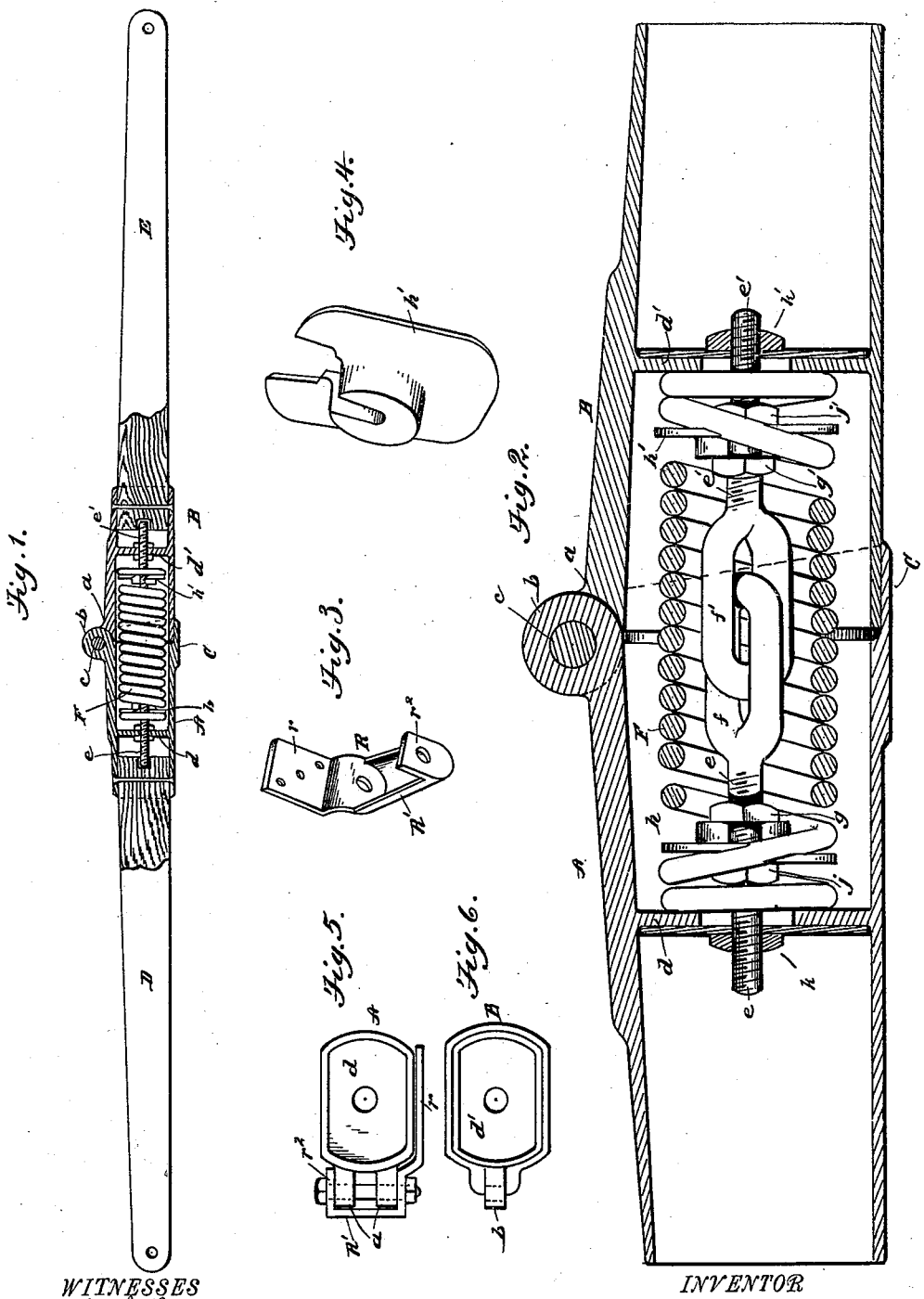
WITNESSES
Effie S. Croft.
D. W. Bradford.
INVENTOR
Edward J. Smith
By Parker & Burton
Attorneys.
THE NATIONAL LITHOGRAPHING COMPANY,
WASHINGTON, D. C.

UNITED STATES PATENT OFFICE.

EDWARD J. SMITH, OF ALMONT, MICHIGAN.

WHIFFLETREE.

SPECIFICATION forming part of Letters Patent No. 508,444, dated November 14, 1893.

Application filed July 15, 1893. Serial No. 480,576. (No model.)

*To all whom it may concern:*

Be it known that I, EDWARD J. SMITH, a citizen of the United States, residing at Almont, State of Michigan, have invented a certain new and useful Improvement in Whiffletrees; and I declare the following to be a full, clear, and exact description of the invention, such as will enable others skilled in the art to which it pertains to make and use the same, reference being had to the accompanying drawings, which form a part of this specification.

This invention relates to whiffletrees, and has for its object an improvement in that class of whiffletrees which yield forward to compensate for the jerking motion of the horse, and to overcome the jarring and irregular motion of the vehicle, due to the irregular motion of the horse.

In the whiffletree which embodies this invention, the yielding motion is produced by cutting the whiffletree into two parts, which are hinged together at their inner ends, or at the middle of the complete whiffletree, and are held together by the hinge pin, and by the concealed spring which is located within cavities in the meeting ends of the two parts of the whiffletree.

In the drawings Figure 1 shows the complete whiffletree, the middle or meeting ends being to show the interior construction. Fig. 2, shows the spring and the coupling links, and the means by which they are united. Fig. 3 shows a guard clevis; Fig. 4, a washer adapted to secure the spring to the coupling link. Figs. 5 and 6 show end views of the meeting ends of the halves of the whiffletree.

A and B, indicate two short tubes provided with hinge knuckles $a$, $b$, and with a pintle hole, $c$, through which a pin or bolt is passed that joins the two short tubes with a rule joint hinge. On one of the short tubes A, is a hood that projects beyond the end of the tube B, and covers the meeting line between the two.

In the outer end of each of the tubes A and B, are inserted short pieces of strong wood which form the main part of the whiffletree. Each of the pieces of wood D and E, are firmly secured to the tubes or bolts. In each of the tubes A and B, near their outer ends is an internal collar, $d$, $d'$. Within the tubes between the collars $d$, $d'$, is an expansion spring F, and within the expansion spring is a pair of linked bolts, $e$, $e'$; each bolt is secured to one end of the spring F, and is also secured to one of the tubes A or B; the means of securing the parts together being as follows: At each end of the spring D, one of the coils is spread slightly from the body of the spring, and the linked bolts are inserted into the spring with one end of the bolt, $e$, which is threaded reaching out beyond the end of the spring at one end, and the threaded end of the bolt $e'$, reaching out beyond the other end of the spring. Adjusting nuts $g$, $g'$, are run onto the screw threads of the bolts, and split rings, $h$, $h'$, of a size large enough to engage with the coil of the spring, and with a perforation or hole small enough to engage with the nuts, $g$, $g'$, are placed in the spread part of the coils as shown in Fig. 2. Holding nuts $j$, $j'$, are next run onto the threaded ends of the bolts, and the parts are adjusted so that the spring can be extended for a short distance before the eyes, $f$, $f'$, of the bolts $e$, $e'$, have reached a drawing position to prevent the further expansion of the spring. The spring and bolts are now inserted in the cavity of the tubes, one end of the bolt, $e'$, passing through the hole in the collar $d'$, and one end of the bolt $e$, passing through the collar, $d$. Holding nuts are next run onto the threaded ends using between them and the collars interposed washers if desired. This part of the assembling must be done before the wooden ends of the whiffletrees are inserted in the tube.

R, indicates the clevis used with this whiffletree which is made with a flat plate $r$, provided with screw holes by which it may be secured to the cross bar of the thills with a standard R', standing at right angles to the plate $r$, and concaved to fit closely over the knuckles $a$, $b$, of the hinge joining the two ends of the whiffletree, at the top and extending backward over the pinhole of the hinge is the leg $r^2$, provided with a pin hole which registers with the pinhole in the plate $r$. This clevis is rigidly secured to the cross-bar and the whiffletree is held by it, by means of the pin which forms the hinge pin of the whiffletree. The hinge pin or knuckle part of the hinge is placed to the front, and the tension of the spring concealed within the cavity within the whiffletree holds the ends of the whiffletree back against the strain of the tugs, but allows the ends of the whiffletree to yield forward, and thus produce the desired yielding and spring action.

The hood C, effectually prevents anything from catching in the opening between the ends of the whiffletree.

What I claim is—

1. In a spring whiffletree, the combination of a two part hollow whiffletree hinged together at its middle, a spring located within the cavity and secured to both of said parts, bolts secured to the ends of said spring, meeting and linked together between the ends thereof, whereby the expansive motion of said spring is limited, substantially as described.

2. In combination with a two part whiffletree, hinged together at its middle point, a spring uniting the two parts, and provided with means to prevent its expansion, and a clevis provided with a concave standard, adapted to form a housing for the hinge, substantially as described.

In testimony whereof I sign this specification in the presence of two witnesses.

EDWARD J. SMITH.

Witnesses:
CHARLES F. BURTON,
EFFIE I. CROFT.